E. B. THOMPSON.

PUMP MECHANISM.

APPLICATION FILED JAN. 16, 1922.

Reissued July 18, 1922.

15,415.

2 SHEETS—SHEET 1.

Witness
Lynn Latta.

Elmer B. Thompson
By
Bair & Trueman
Atty's

E. B. THOMPSON.
PUMP MECHANISM.
APPLICATION FILED JAN. 16, 1922.
Reissued July 18, 1922. 15,415.
2 SHEETS—SHEET 2.
Fig 3
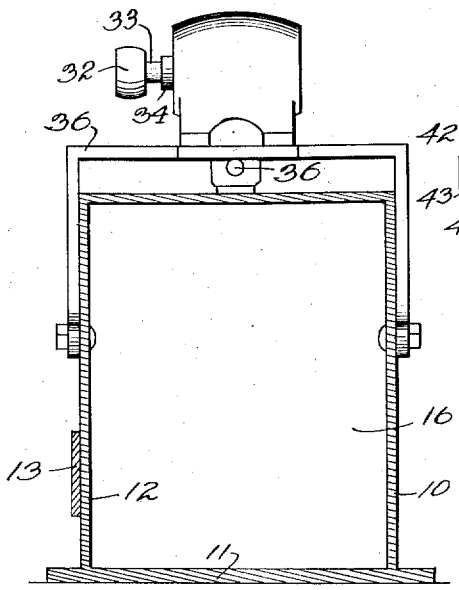
Fig 6
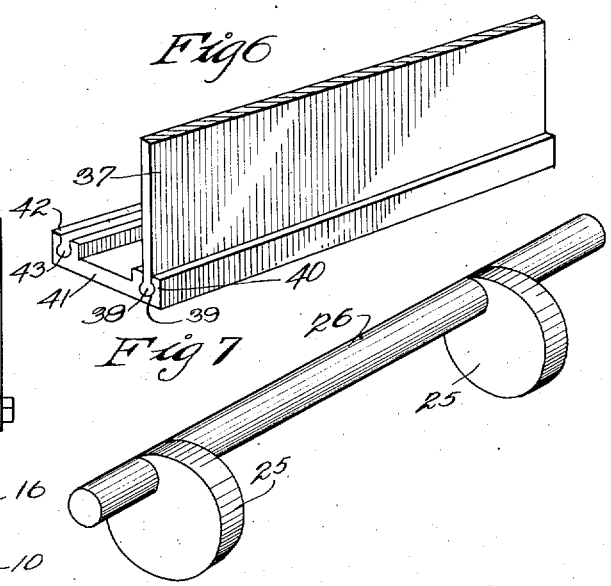
Fig 7
Fig 4
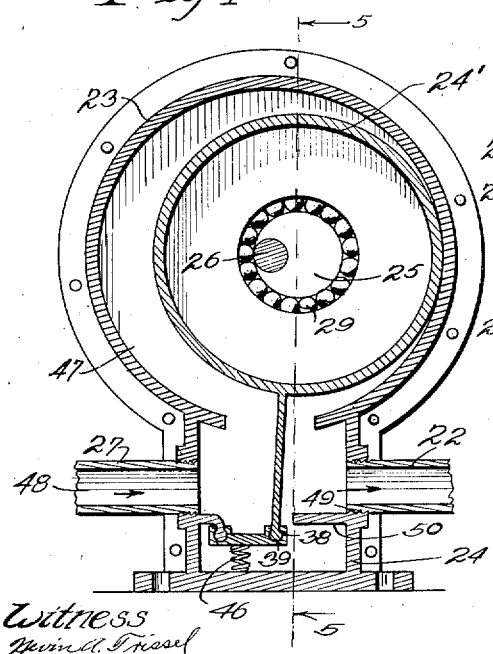
Fig 5
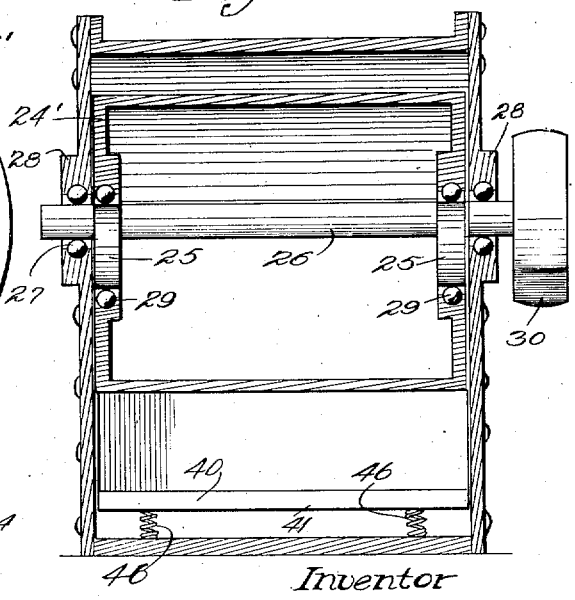
Witness
Irvin A. Friesel
Inventor
Elmer B. Thompson
By Bair & Freeman Attorneys

UNITED STATES PATENT OFFICE.

ELMER B. THOMPSON, OF DES MOINES, IOWA, ASSIGNOR TO THOMPSON MANUFACTURING COMPANY, OF DES MOINES, IOWA.

PUMP MECHANISM.

15,415. Specification of Reissued Letters Patent. Reissued July 18, 1922.

Original No. 1,156,724, dated October 12, 1915, Serial No. 842,712, filed June 3, 1914. Application for reissue filed January 16, 1922. Serial No. 529,781.

*To all whom it may concern:*

Be it known that I, ELMER B. THOMPSON, a citizen of the United States, residing at Des Moines, in the county of Polk and State of Iowa, have invented new and useful Improvements in Pump Mechanism, of which the following is a specification.

The primary object of the invention is the provision of a pump mechanism for a dust collector wherein the dust laden air will be passed through the same for separating the dirt from the air to clarify it prior to the delivery of the same from the machine, the pump for creating a suction within the collector being of novel form to insure service and durability.

Another object of the invention is the provision of a pump mechanism of this character wherein the same is positive in action and practically frictionless when operating.

A further object of the invention is the provision of a pump mechanism of this character which is extremely simple in construction, thoroughly reliable and efficient in its operation, and inexpensive in manufacture.

With these and other objects in view, the invention consists in the construction, combination and arrangement of parts as will be hereinafter fully described, illustrated in the accompanying drawings, and pointed out in the claims hereunto appended.

In the drawings:—

Figure 3 is a vertical, transverse sectional view thereof.

Figure 4 is an enlarged vertical, sectional view through the pump.

Figure 5 is a sectional view on the line 5—5 of Figure 4.

Figure 6 is a perspective view of the hinge plates; and

Figure 7 is a perspective view of the eccentric.

Similar reference characters indicate corresponding parts throughout the several views in the drawings.

Figure 1:
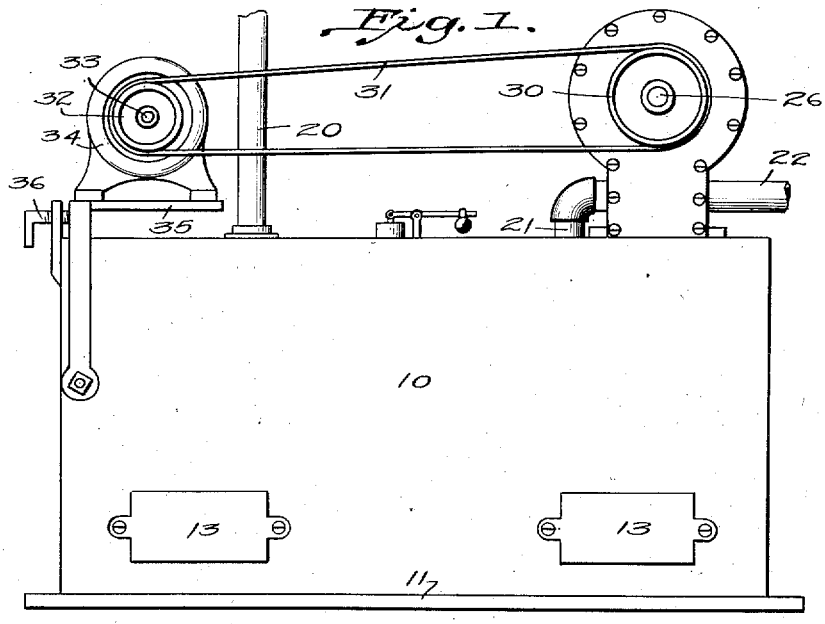
Figure 1 is a side elevation of a machine constructed in accordance with the invention.
Figure 2:
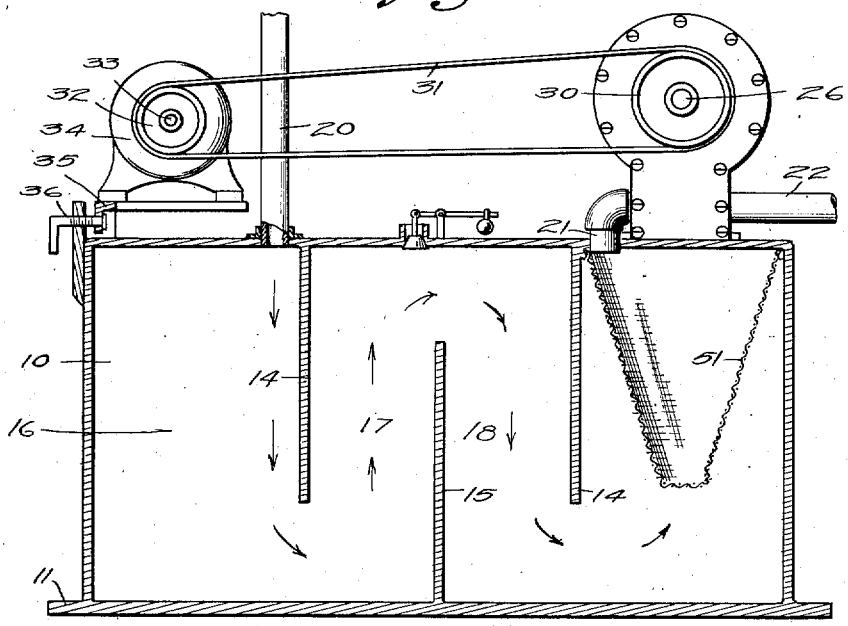
Figure 2 is a vertical, longitudinal, sectional view through the collector.

Referring to the drawings in detail, the dust collector comprises a rectangular-shaped or box-like casing 10 formed with a base 11 for supporting the same. Formed in one side of the case 10 are suitable ports 12 which are adapted to be normally closed by means of cover plates 13 detachably secured to the outer face of the case in any suitable manner, and on the removal of the plates 13 access may be had to the interior of the case for the cleaning of the same.

Arranged within the case 10 are spaced vertically disposed partitions 14 and 15 respectively, the partitions 14 being extended from the top of the case toward and terminating spaced from the bottom, while the partition 15 extends from the bottom toward and terminates spaced from the top of the case so as to form communicating compartments 16, 17, 18 and 19 therein. By reason of the internal arrangement of the case, the air introduced into the collector is compelled to pass therethrough along the circuitous course indicated by the arrows. Leading to the compartment 16 through the top of the case 10 is an inlet pipe 20 which is adapted to extend to or into a closure so that on the working of the collector dust laden air will be conveyed through the pipe 20 into the case 10 for the separation of the dust from the air in a manner presently described.

Mounted upon the top of the case 10 directly above the compartment 19 is a pump having an intake pipe 21 leading from the compartment 19, and an exhaust pipe 22 which may extend to any desirable point, the pump being hereinafter fully described.

The pump comprises an outer cylinder 23 supported by a hollow base or pedestal 24 which is fixed in any suitable manner to the top of the casing 10 and within the cylinder 23 is eccentrically mounted an inner cylinder 24′, the same being supported upon eccentrics 25 integral with a driving shaft 26 which is passed through the ends of the outer cylinder 23, the shaft being surrounded by means of bearing balls 27 suitably seated in the bearings 28 formed on the ends of the outer cylinder. Likewise surrounding the eccentrics 25 are bearing balls 29 which are held in any suitable manner in the openings for receiving the eccentrics in the ends of the cylinder 24′. On one end of the shaft 26 is fitted a belt pulley 30 over which is trained an endless belt 31, the same being trained over a belt pulley 32 fixed to a shaft 33 suitably journaled in a bar 34 mounted upon an adjustable support 35 swingingly connected to the case 10 at the opposite end thereof, the support 35 being adjusted by means of an adjusting device 36 which enables the tightening of the belt 31 on the pulleys to avoid slipping thereover.

Fixed to or integral with the inner cylinder 24′ at one point of its periphery is a blade or wing 37 which is co-extensive with the length of the said inner cylinder and is projected into the hollow base or pedestal 24 of the pump case 23, the free edge of the said plate or wing 37 being formed with a circular portion 38 which loosely fits within a correspondingly shaped groove 39 formed in an upturned flange 40 on a hinged plate 41 so that the wing or blade will have knuckle-joint connection with each other. The opposite upturned flange of the plate is formed with a groove 43 receiving the rounded portion 42 of a hanger 44 which is fixed integral with one wall of the pedestal and in this manner the said plate 41 can readily swing to allow for the variance in the stroke of the wing or blade during the eccentric movement of the inner cylinder 24′ within the outer cylinder 23 of the pump. Arranged beneath the plate 41 and working against the same are coiled expansion springs 46 which are seated in any suitable manner and serve as counterbalancing means for the inner cylinder and plate 41 during the working of the inner cylinder. It will be apparent that when the inner cylinder 24′ is eccentrically shifted the concentric space 47 between the periphery thereof and the wall of the cylinder 23 will be varied for creating a suction at one side of the blade 37 while at the opposite side of the latter an exhaust takes place thus insuring a constant suction within the pump. The pedestal or base is formed with an inlet port 48 which communicates with the pipe 21 while at the opposite side of the blade or wing 37 is an outlet portion 49 with which communicates the exhaust pipe 22 so that air will be sucked into the pump through the pipe 21 and exhausted therefrom through the pipe 22 during the working of the dust collector.

The lower end of the pedestal 24 of the pump is adapted to contain oil for lubricating the parts thereof and this oil is prevented from being blown out through the exhaust pipe 22 by means of a baffle or guard plate 50 which extends horizontally toward the hinged plate 41 within the pedestal of the pump cylinder.

Suitably fixed to the top of the case 10 and depending within the compartment 19 is a downwardly tapered filtering bag 51 which prevents the dust and foreign matter from entering the pump through the pipe 21 when the collector is in action.

From the foregoing, it is thought that the construction and manner of operation of the devices will be clearly understood, and therefore a more extended explanation has been omitted.

Having thus described the invention, what I claim as new is:

1. A pump comprising a stationary outer cylinder, a hollow support therefor communicating with the same and having intake and exhaust ports, an eccentrically movable inner cylinder within the said outer cylinder for contact at one point in its periphery with the wall of the latter, a wing at the periphery of the inner cylinder and extended into the hollow support, a plate flexibly connecting the wing with one wall of the support below one of the ports to shut off communication between the spaces at the opposite sides of the said wing within the cylinder and support, and counterbalancing means for the plate and inner cylinder.

2. A pump comprising a stationary outer cylinder, a hollow support therefor communicating with the same and having intake and exhaust ports, an eccentrically movable inner cylinder within the said outer cylinder for contact at one point in its periphery with the wall of the latter, a wing at the periphery of the inner cylinder and extended into the hollow support, a plate flexibly connecting the wing with one wall of the support below one of the ports to shut off communicatiion between the spaces at opposite sides of the said wing within the cylinder and support, resilient means for counterbalancing the plate and inner cylinder, and a deflector extension within the support below the other port.

3. A pump comprising a stationary outer cylinder, a hollow support therefor communicating with the same and having intake and exhaust ports, an eccentrically movable inner cylinder within the said outer cylinder for contact at one point in its periphery with the wall of the latter, a wing at the periphery of the inner cylinder and extended into the hollow support, a plate flexibly connecting the wing with one wall of the support below one of the ports to shut off communication between the spaces at opposite sides of the said wing within the cylinder and support, resilient means for counterbalancing the plate and inner cylinder, a deflector extension within the support below the other port, and means for moving the inner cylinder.

Des Moines, Iowa, November 3, 1921.

ELMER B. THOMPSON.